United States Patent
Overhoff et al.

(10) Patent No.: US 8,789,362 B2
(45) Date of Patent: Jul. 29, 2014

(54) METERING SYSTEM FOR INJECTING A REDUCING AGENT INTO THE EXHAUST GAS FLOW OF AN INTERNAL COMBUSTION ENGINE

(75) Inventors: Werner Overhoff, Marl (DE); Denis Leichinger, Menden (DE)

(73) Assignee: Albonair GmbH, Dortmund (DE)

( * ) Notice: Subject to any disclaimer, the term of this patent is extended or adjusted under 35 U.S.C. 154(b) by 452 days.

(21) Appl. No.: 13/008,618

(22) Filed: Jan. 18, 2011

(65) Prior Publication Data

US 2011/0192151 A1  Aug. 11, 2011

(30) Foreign Application Priority Data

Feb. 10, 2010  (DE) .................. 10 2010 007 564

(51) Int. Cl.
*F01N 3/00* (2006.01)
*F01N 3/10* (2006.01)
*F01N 3/20* (2006.01)

(52) U.S. Cl.
CPC ....... *F01N 3/2066* (2013.01); *F01N 2610/1433* (2013.01); *Y02T 10/24* (2013.01); *F01N 2610/02* (2013.01); *F01N 2610/1406* (2013.01)
USPC .................. 60/295; 60/301; 60/303

(58) Field of Classification Search
USPC ......................... 60/295, 301, 303
See application file for complete search history.

(56) References Cited

U.S. PATENT DOCUMENTS

| | | | |
|---|---|---|---|
| 6,167,698 B1 * | 1/2001 | King et al. | 60/286 |
| 6,273,120 B1 * | 8/2001 | Hofmann et al. | 137/98 |
| 6,834,498 B2 * | 12/2004 | van Nieuwstadt et al. | 60/286 |
| 6,845,611 B2 | 1/2005 | Huthwohl et al. | |
| 7,703,276 B2 * | 4/2010 | Ueno | 60/286 |
| 7,937,934 B2 * | 5/2011 | Plougmann | 60/286 |
| 8,266,892 B2 * | 9/2012 | Zapf et al. | 60/286 |
| 2003/0213234 A1 * | 11/2003 | Funk et al. | 60/286 |
| 2009/0028729 A1 * | 1/2009 | Jochumsen et al. | 417/413.1 |
| 2009/0031714 A1 * | 2/2009 | Jochumsen et al. | 60/303 |
| 2009/0230136 A1 | 9/2009 | Dougnier et al. | |
| 2009/0293452 A1 * | 12/2009 | Tarabulski | 60/276 |
| 2011/0016852 A1 | 1/2011 | Haeberer et al. | |

FOREIGN PATENT DOCUMENTS

| | | |
|---|---|---|
| DE | 201 19 514 U1 | 3/2001 |
| DE | 10 2006 061 736 A1 | 7/2008 |
| DE | 10 2008 045 958 A1 | 3/2010 |

OTHER PUBLICATIONS

German Search Report relating to German Patent Application No. 10 2010 007 564.7.

* cited by examiner

*Primary Examiner* — Kenneth Bomberg
*Assistant Examiner* — Audrey K Bradley
(74) *Attorney, Agent, or Firm* — Law Offices of Robert F. Zielinski LLC

(57) ABSTRACT

A metering system for injecting a reducing agent into the exhaust gas flow of an internal combustion engine for selective catalytic reduction, including a reducing agent tank, a metering pump, an air compressor for a compressed air supply, at least one nozzle which is in a flow connection to a pressure line of the compressed air supply and a pressure line of the metering pump and by which the reducing agent can be injected into the exhaust gas flow by means of compressed air, the air compressor being located on a mounting plate and having channels which form intake and pressure lines of the air compressor and which have connection regions at the outlets from the mounting plate and one or more pockets which are in a flow connection to the channels and which form the intake connection and/or the pressure connection of the air compressor.

20 Claims, 5 Drawing Sheets

METERING SYSTEM FOR INJECTING A REDUCING AGENT INTO THE EXHAUST GAS FLOW OF AN INTERNAL COMBUSTION ENGINE

This application claims the priority of German Patent Application DE 10 2010 007 564.7 filed 10 Feb. 2010.

The invention relates to a reducing agent metering system for injecting a reducing agent into the exhaust gas flow of an internal combustion engine for selective catalytic reduction, the metering system being connected/connectable to a reducing agent tank from which the reducing agent is taken and conveyed by means of a metering pump, and there being a compressed air supply which has an electrical air compressor, the metering system having at least one nozzle which is in a flow connection to a pressure line of the compressed air supply and a pressure line of the metering pump and by which the reducing agent can be injected into the exhaust gas flow by means of compressed air.

Metering systems for delivering a reducing agent into the exhaust gas flow for selective catalytic reduction of nitrogen oxides (SCR) are known. For this purpose a reducing agent is injected into the exhaust gas system with a metering device. The reducing agent is ammonia. In this sense the reducing agent or urea solution are defined as both ammonia and also a urea solution or another reducing agent and especially so-called AdBlue, i.e. a urea solution according to DIN 70070. So-called SCR catalytic converters are used to reduce nitrogen oxide emission of diesel engines.

Since it is dangerous to carry ammonia in motor vehicles, urea in an aqueous solution with a conventionally 32.5% urea proportion is used. In the exhaust gas the urea decomposes at temperatures above 150° C. into gaseous ammonia and $CO_2$. Parameters for the decomposition of the urea are essentially the time (vaporization and reaction time), the temperature and the droplet size of the injection urea solution. The emission of nitrogen oxides is reduced by roughly 90% in these SCR catalytic converters by selective catalytic reduction (SCR).

Various systems for injection of urea as the reducing agent are known. The injection of urea can be supported by compressed air. The compressed air is used as an energy supplier. This is advantageous for achieving small droplets. The urea solution is metered by means of a metering system and injected in the exhaust gas flow and provides for the desired chemical reaction in the SCR catalytic converter. In this connection the nitrogen oxides are converted into nitrogen and water vapor.

DE 201 19 514 U1 discloses a reducing agent metering device in which the compressed air is made available for formation of an aerosol by the charging air of a charging group of the internal combustion engine. This enables use of a metering system even in vehicles and machines which do not have their own compressed air supply, but whose engine is supercharged.

The disadvantage here is that for sufficient supply with compressed air a minimum rpm of the engine is necessary and the compressed air is available only after a certain length of operation. At other operating points, for example a low rpm and/or engine load, however sufficient compressed air supply is not ensured by the engine supercharger.

To overcome this, there being an additional, separate air compressor for producing and making ready the required air is known. The disadvantage here is the complex mounting of an additional component and the requirement of providing additional hoses and lines for the connection of the air compressor. It is especially disadvantageous in the known systems that additional holding devices are necessary for the air compressor itself, as a result of which the production and installation cost is very high.

The object of the invention is to overcome these disadvantage and to develop a generic metering device such that the air compressor can be easily integrated into the metering system within the compressed air supply and the entire arrangement allows simple installation.

This object is achieved as claimed in the invention by a metering system as claimed in the claims that follow. Advantageous configurations of the invention are given in the dependent claims.

In the reducing agent metering system for injection of a reducing agent into the exhaust gas flow of an internal combustion engine for selective catalytic reduction, the metering system being connected/connectable to a reducing agent tank from which the reducing agent is taken and conveyed by means of a metering pump, and there being a compressed air supply which has an electrical air compressor, the metering system having at least one nozzle which is in a flow connection to a pressure line of the compressed air supply and a pressure line of the metering pump and by which the reducing agent can be injected into the exhaust gas flow by means of compressed air, it is especially advantageous that the air compressor is located on a mounting plate and is flanged to the latter, the mounting plate integrating channels which form the intake line and the pressure line of the air compressor and which have connection regions at the outlets from the mounting plate, and that one or more pockets which are in a flow connection to the channels and which form the intake connection and/or the pressure connection of the air compressor are made in the mounting plate.

This enables very simple and economical mounting of the air compressor of the compressed air supply and thus integration into the metering system. Because channels which form the intake line and pressure line of the air compressor and which have connection regions at the outlets from the mounting plate are integrated into the mounting plate, a series of hoses and their complex installation are eliminated. Instead, only the air compressor need be placed on the mounting plate and flanged. Furthermore, in the mounting plate pockets are made which form the intake connection and/or the pressure connection of the air compressor. Thus prefabrication is possible so that only the complete unit of mounting plate and air compressor need be mounted. The mounting plate for this purpose has preferably the corresponding fastening regions, holes or the like. The air compressor or air pump can be a membrane compressor or a piston compressor or another type of compressor.

Quarter-turn fasteners, clamps or the like which enable simple and prompt mounting of the hoses can be located on the connection regions.

Preferably there is a pressure sensor in the pressure line of the air compressor.

Evaluating and monitoring the sensor signal ensure monitoring of the compressed air supply of the metering system, in particular, the compressor can be turned on/off or adjusted depending on the measured pressure.

Preferably the intake line and/or pressure line of the air compressor has at least one nonreturn valve. This ensures that backflow of the fluid within the intake line and/or the pressure line of the air compressor is prevented and the nonreturn valve opens automatically only at the corresponding delivery pressure in the delivery direction.

The internal combustion engine into whose exhaust gas system the metering system for injection of reducing agent into the exhaust gas is integrated can be a supercharged engine. It is therefore also possible for at least part of the compressed air to be taken from a supercharger of the internal combustion engine, and for the compressed air supply parallel to the air compressor to have another channel or a bypass so that the charging air of the supercharger can overflow the compressor via the bypass or the output discharges from the supercharger into the intake connection of the compressor. A supercharged engine is therefore an engine with a supercharging group which can be an exhaust gas turbocharger and/or a compressor.

For this purpose, in one preferred embodiment at least one other channel is made in the mounting plate into which the pressure line of the air compressor discharges via at least one nonreturn valve and which is supplied with compressed air from the supercharger of the internal combustion engine.

At the operating points of the engine in which a sufficient charging pressure of the supercharger, therefore for example of a turbocharger or a compressor, is available, the charging air, i.e. some of the charging air removed for this purpose, is used to atomize the reducing agent solution, the air compressor which is intended for compressed air supply operating only in low load or low rpm in order to make ready the compressed air which is necessary for the metering system.

By evaluating the signal of a pressure sensor in the pressure line of the compressed air supply, in the metering system the compressed air supply can thus be provided from a supercharger of the supercharged internal combustion engine and optionally alternatively or cumulatively from an electrical air compressor which can be turned on if necessary. In this way, at all operating points of the engine compressed air supply of the reducing agent metering system is ensured.

Preferably the bypass has a nonreturn valve. On the one hand, in this way the backflow of compressed air of the electrical air compressor via the bypass is prevented, on the other hand this pressure-actuated valve opens automatically as soon as sufficient charging pressure of the supercharger is available so that the charging air can then be used to atomize the reducing agent.

Preferably, downstream of the compressor there is a pressure sensor upstream of the nozzle so that the air compressor is turned on/off depending on the pressure which has been measured by means of the pressure sensor.

The prevailing air pressure can be detected by the placement of a pressure sensor in the compressed air line of the metering system downstream of the compressor. If the prevailing pressure exceeds the pressure necessary for atomization or the delivery pressure of the air pump, enough charging air from the supercharger of the internal combustion engine is available so that the electrical air compressor can be turned off. Conversely, the compressor is turned on when the air pressure undershoots a definable value, i.e. when the charging pressure of the supercharging group of the internal combustion engine is too low.

Preferably the mounting plate is located on the same or a second mounting plate and flanged on it, channels which form the intake line and the pressure line of the metering pump being integrated into the mounting plate of the metering pump.

In this way it is likewise possible to integrate the metering pump for delivery of the reducing agent solution in a likewise advantageous and simple manner into the overall system by its being flanged onto a corresponding mounting plate. The mounting plate on which the metering pump is located can be the same mounting plate on which the air compressor is flanged, or a second mounting plate. In this way the metering system can be matched to the available installation space.

This is especially advantageous since the installation space is always very limited for example in motor vehicle construction and truck construction. By using two mounting plates, both components can be arranged separately from one another. Using a single mounting plate yields an especially compact embodiment.

The mounting plate/plates for this purpose have fastening areas such as holes or the like to mount the assembly. Preferably the assembly is fastened directly on the reducing agent tank itself.

Preferably there is a connecting line between the reducing agent line and the line of the compressed air supply, the connecting line having a switching valve, especially a solenoid valve.

In order to completely interrupt the air supply in metering pauses, it is necessary to move the reducing agent such as urea away from the hot zones to prevent deposits from forming. But urea is named only by way of example for any other reducing agent. The urea would decompose at high temperatures and lead to deposits and thus to clogs. By placing the compressed air line, i.e. a connecting line between the reducing agent line, i.e. the urea line, and a line of the compressed air supply, these deposits can be prevented by the reducing agent line being blown free by means of compressed air in the metering pauses. A switching valve such as for example a solenoid valve is inserted into this connecting line and is opened for blowing free the urea line at the existing air pressure in the air line, therefore preferably with the air pump turned on.

In metering operation this switching valve is closed. In order to blow the urea line free with compressed air, the urea delivery by the metering pump is turned off and the switching valve is opened. This causes a pressure drop in the metering line and the compressed air drives the urea into the exhaust gas system. The line is thus cleaned by means of compressed air. After a brief air blast the urea is blown out of the metering nozzle and air supply can be completely shut off.

Preferably, in the pressure line through which the reducing agent is conveyed, there is a pressure sensor and/or a temperature sensor between the metering pump and the nozzle. This makes it possible to monitor the operating parameters of reducing agent delivery such as the pressure and temperature of the reducing agent at any time.

Preferably the metering system has a sensor for measuring the exhaust gas temperature.

From the exhaust gas temperature it is possible to control the pressure and/or the amount of air and/or the metered amount of reducing agent and/or valve opening times via corresponding control electronics since the exhaust gas temperature is a parameter for selective catalytic reduction.

Preferably the mounting plate of the air compressor and/or of the metering pump is composed of two plates lying on top of one another, channels being made, especially milled, into one or both plates and being closed by the other plate.

This enables especially advantageous and simple production of the mounting plate(s) since the required channels and pockets are formed by recesses made in one or both plates.

In operation, the metering system is coupled to a control device by means of which the air compressor and the metering pump are controlled depending on the engine data and sensor data.

Optimization of the operation of the metering system, i.e. especially air optimization, can be especially advantageously implemented by the arrangement of this control device which controls one or more components of the metering system depending on the measured sensor values, i.e. depending on the current operating parameters. This control device thus makes it possible to adapt the amount of reducing agent delivered and the amount of air delivered in an optimum manner to the current operating parameters of the internal combustion engine and the catalytic converter for selective catalytic reduction and to adjust them.

The figures show several embodiments of the invention which are detailed below.

In FIGS. 1 to 5 identical components are provided with identical reference numbers. FIGS. 1-3 show perspective views of three embodiments of the metering system for injection of a reducing agent into the exhaust gas flow of an internal combustion engine for selective catalytic reduction.

In the following description reference is likewise made to the other components shown in the connection and line diagrams.

There is an electrical delivery pump 1 for delivery of the reducing agent from a reducing agent tank. The reducing agent is delivered via the line 7 by means of the metering pump 1.

The reducing agent is atomized by means of compressed air which is taken from a supercharging group of a supercharged internal combustion engine via a line 5. If the charging pressure is too low in the internal combustion engine, this is ascertained by the air pressure sensor 9 in the pressure line 6 and the air compressor 2 is turned on in order to make available compressed air via the pressure line 6. Fresh air is supplied to the air compressor 2 via the intake line or fresh air line 4.

The air compressor 2 is mounted on the mounting plate 3 and flanged to it. The corresponding flow channels are made in the mounting plate 3 for routing the air, in the mounting plate 3 at the same time pockets generally defined by (20) being made which form the intake mouth and the pressure connection of the air compressor 2.

The pockets are parts of the flow channels integrated into the mounting plate generating the compressors inlet and outlet.

Figure 1:
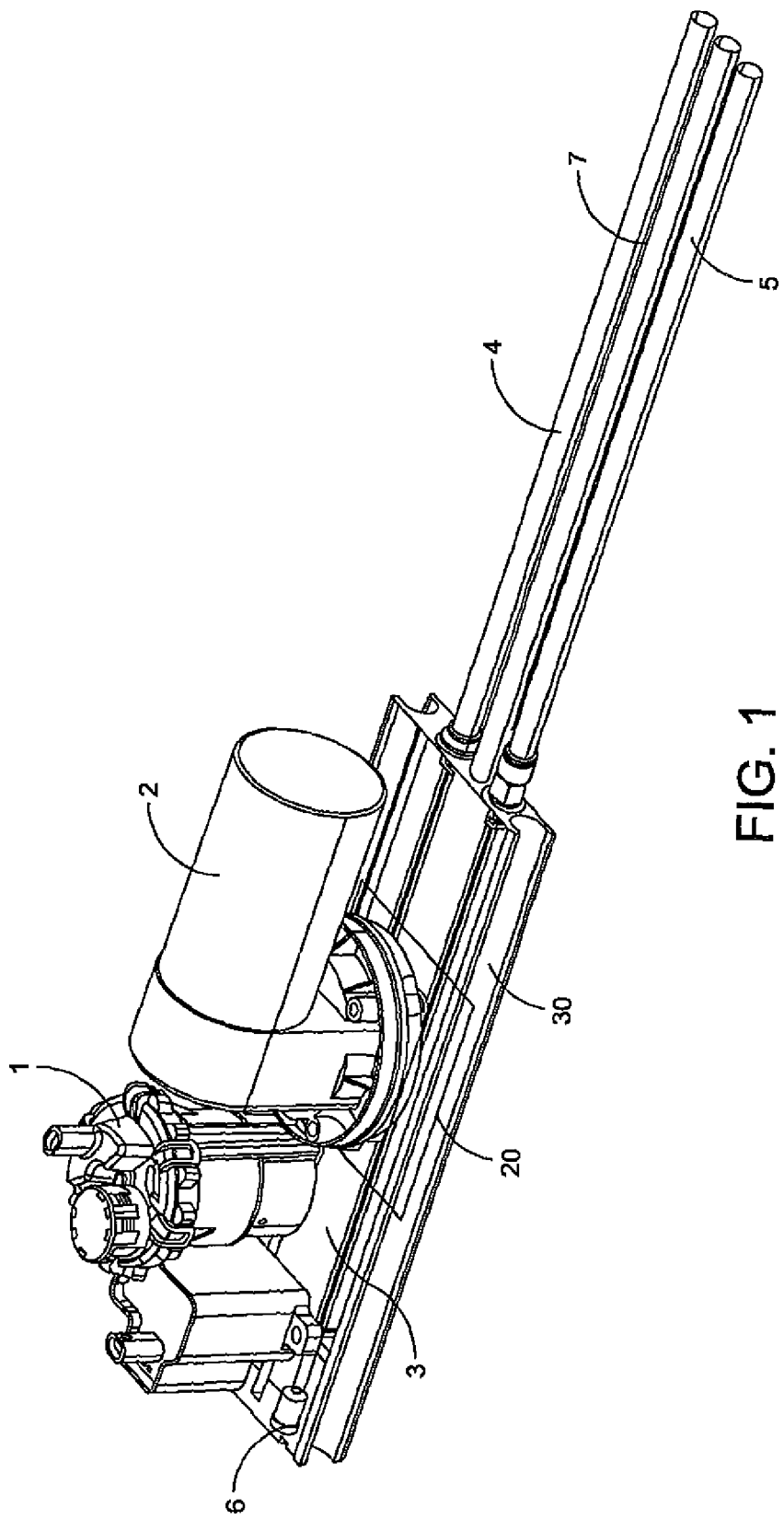
FIG. 1 shows a perspective view of a first embodiment of the metering system.

In the first exemplary embodiment of the invention shown in FIG. 1, the metering pump 1 is likewise located on the same mounting plate 3. Flow channels to and from the metering pump 1 are also made in the mounting plate 3 so that the pump 1 need be flanged only on the plate 3. The entire assembly, then made very compact, for example can be located directly on the reducing agent tank.

On the longitudinal sides the mounting plate 3 has grooves 30 which run lengthwise. In the installed state coolant lines of the internal combustion engine are inserted or clipped into these grooves 30 so that the mounting plate 3 forms a heat sink of the coolant circuit of the internal combustion engine. In this way, heat is transferred accordingly to the mounting plate 3 and accordingly the components located on the mounting plate 3 are heated, by which freezing of the reducing agent within the pump 1 and within the flow channels which are made in the mounting plate 3 is prevented.

Figure 2:
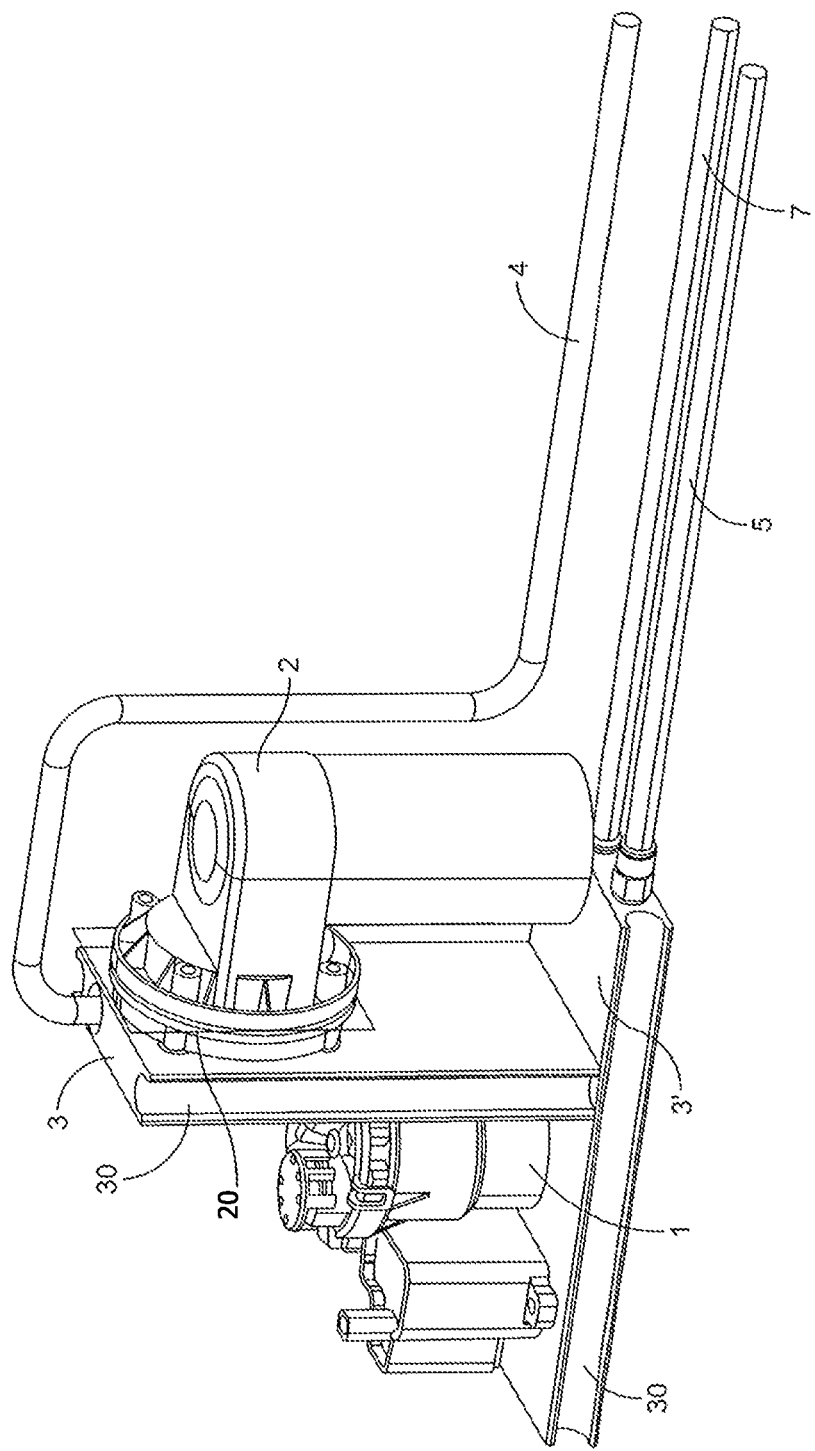
FIG. 2 shows a perspective view of a second embodiment of the metering system.

The second embodiment of a metering system as shown in FIG. 2 differs from the first embodiment in that the mounting plate 3' on which the air compressor 2 is flanged is mounted vertically on the second mounting plate 3. The second mounting plate 3 bears the pump 1.

With respect to flow routing, the two embodiments as shown in FIG. 1 and FIG. 2 are identical. The vertical arrangement of the mounting plate 3' on the second mounting plate 3 enables a divergent three-dimensional division in order to be able to match the metering system in its entirety to the existing installation space. Otherwise identical components are identified with identical reference numbers.

Separate line routing is saved and the entire assembly becomes very compact due to the combination of the air compressor 2 and metering pump 1 on a component carrier 3, 3' according to the embodiments as shown in FIG. 1 or FIG. 2.

Figure 3:
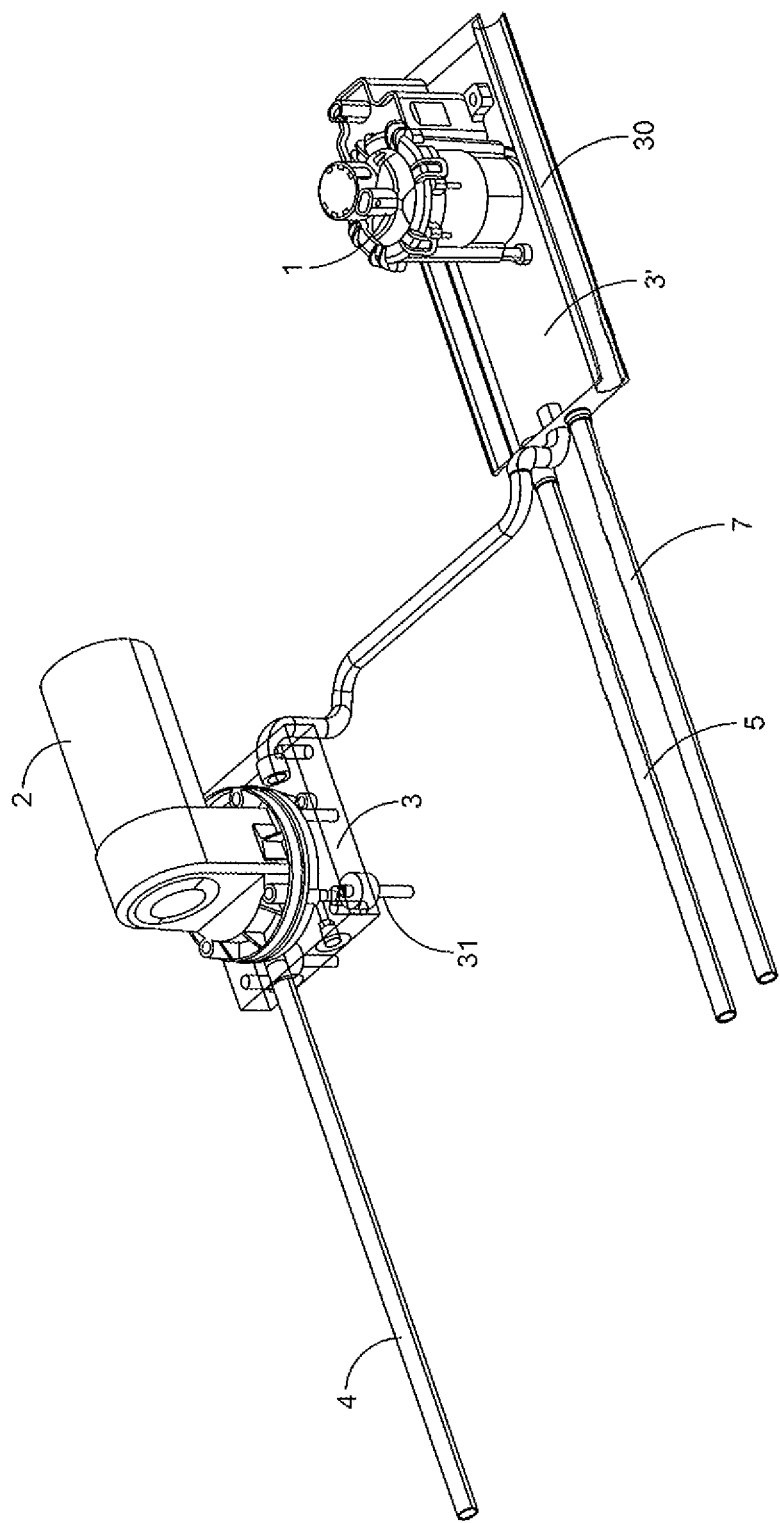
FIG. 3 shows a perspective view of a third embodiment of the metering system.

To the extent installation space is required, it is however also possible to arrange the air compressor 2 and the metering pump 1 separately, as is the case in the embodiment as shown in FIG. 3. In this connection the compressor 2 is located on the first mounting plate 3 and the metering pump 1 is located on the second mounting plate 3' which can be attached spatially apart from one another. To attach the mounting plates, in all embodiments there are the corresponding holes and fasteners in the form of screws 31.

Figure 4:
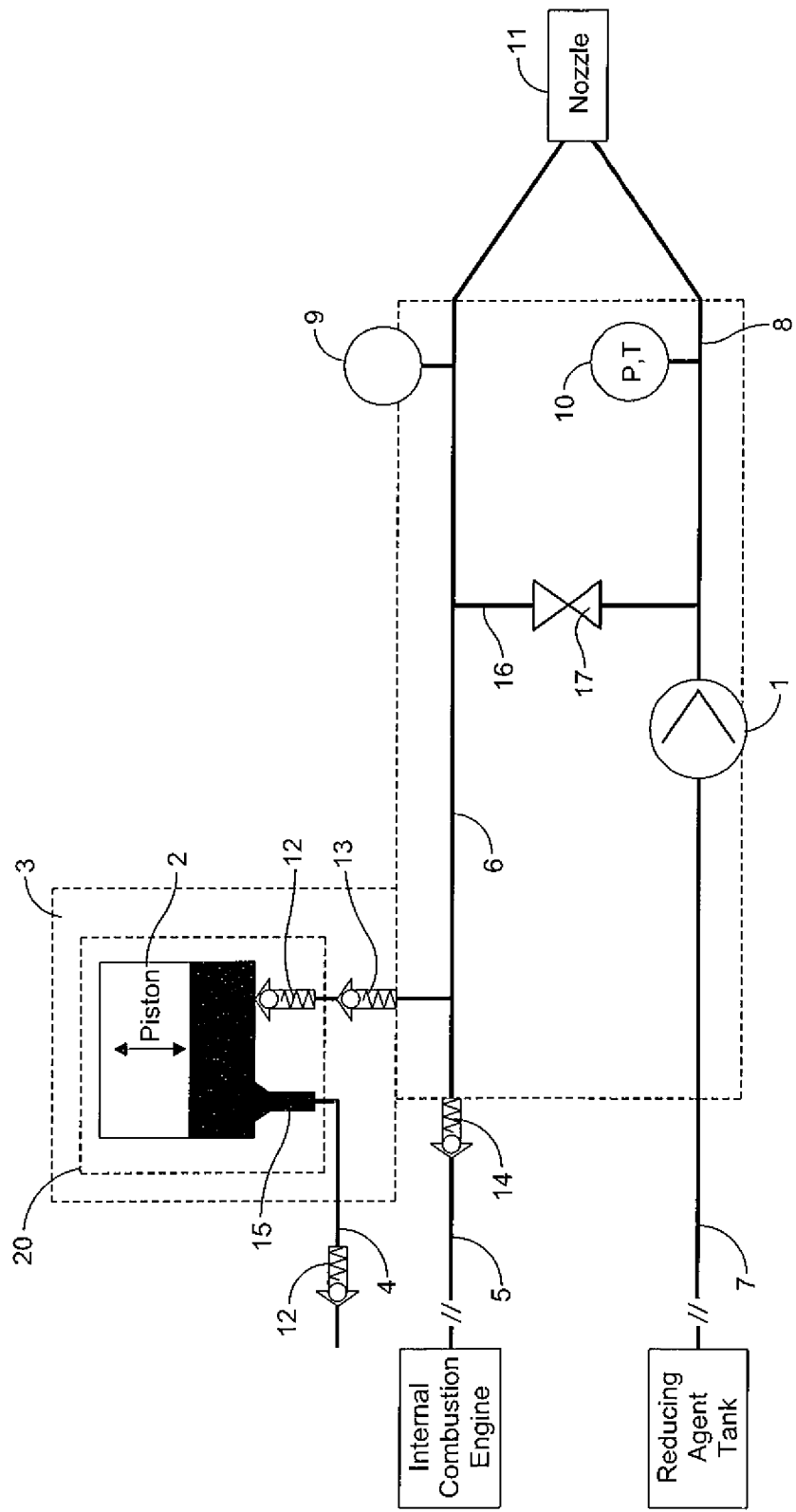
FIG. 4 shows a connection and line diagram according to the embodiments shown in FIG. 1 and FIG. 2.
Figure 5:
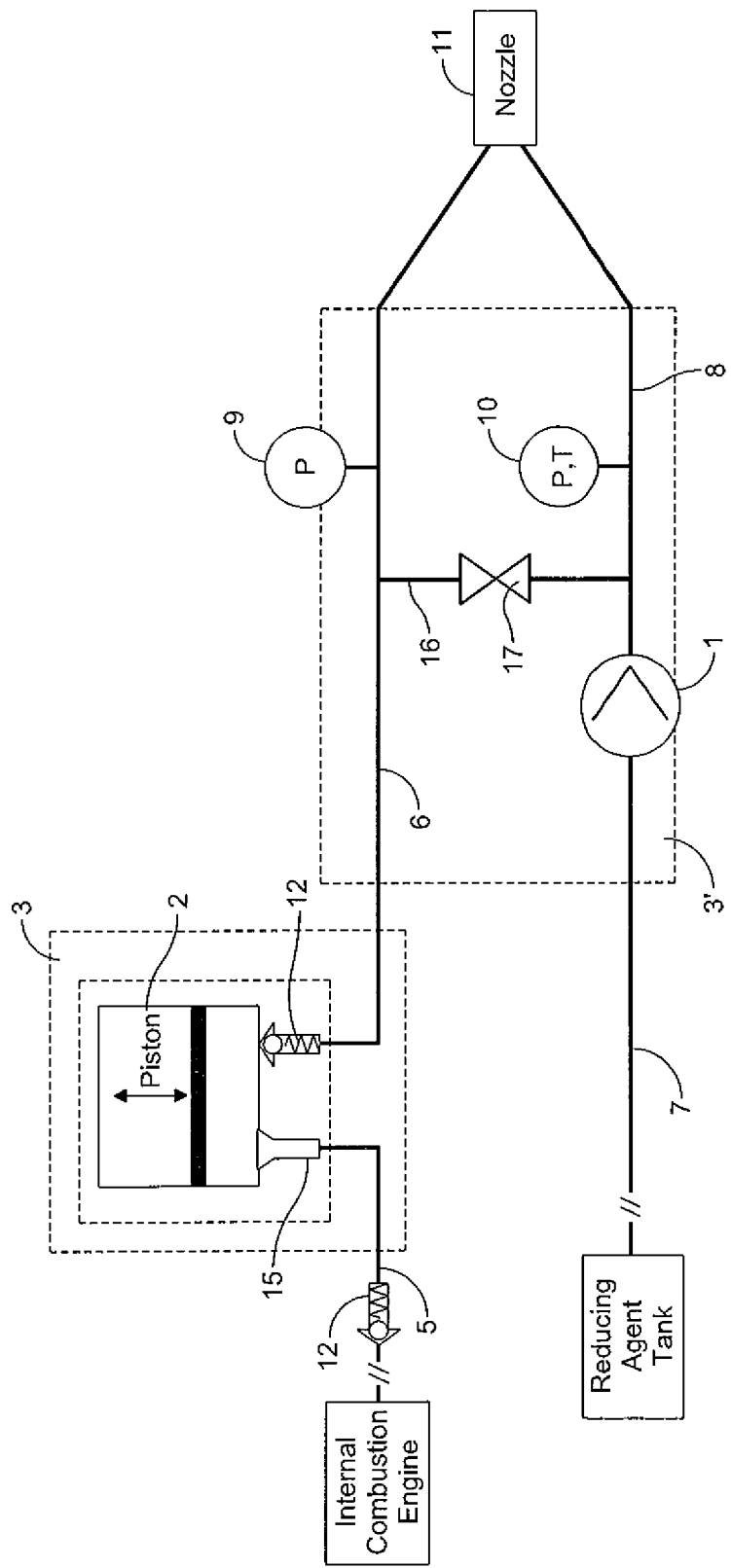
FIG. 5 shows a connection and line diagram according to the embodiments shown in FIG. 3.

The connection and line diagrams of the different embodiments are shown in FIGS. 4 and 5. FIG. 4 shows the connection and line diagram of the first two embodiments as shown in FIG. 1 and FIG. 2.

A reducing agent, for example a urea solution, is taken from the reducing agent tank via the line 7 and is conveyed to the nozzle 11 by means of the metering pump 1 via the pressure line 8. In the pressure line 8 there is a sensor 10 for detecting the pressure and the temperature of the reducing agent solution.

Atomization within the nozzle 11 takes place by means of compressed air which is fed into the pressure line 6 which likewise runs to the nozzle 11 via an air inlet 5 proceeding from the turbocharger of the internal combustion engine via a nonreturn line 14. In the air pressure line 6 there is a pressure sensor 9 for detecting the prevailing air pressure. If the charging pressure is too low in the internal combustion engine, this is ascertained by the air pressure sensor 9.

Depending on the prevailing pressure, the air compressor 2 in the form of a piston compressor is turned on. The air inlet 4 of the piston compressor 2 is supplied with fresh air originating from the air filter of the internal combustion engine. The compressed air of the air compressor 2 is fed into the pressure line 6 via two nonreturn valves 12, 13.

In this embodiment there are two nonreturn valves 12, 13 downstream of the air compressor 2. This is because the valves in the air compressors are often made from temperature-sensitive components or materials in order to represent the correspondingly small dead spaces in the air compressor. The charging air of the turbocharger is however often very hot and could adversely affect or damage these small nonreturn valves which are located on the pressure side of the pump. Therefore, in the embodiments shown in FIG. 4 downstream of the first nonreturn valve 12 there is a second nonreturn valve 13 within the mounting plate 3'. The required valves can thus likewise be integrated into the mounting plate 3.

When the internal combustion engine is turned off, the reducing agent line 8 between the metering pump 1 and nozzle 11 must be flushed with air.

For this purpose, there is a connecting line 16 between the pressure line 6 of the compressed air supply and the reducing agent tine 8 which contains a switching valve 17. The switching valve 17 in the illustrated embodiment is a solenoid valve.

The solenoid valve 17 is opened to flush the metering agent line 8 by means of air. Here the metering pump 1 is turned off. By means of the air compressor 2 compressed air is blown into the reducing agent line 8 since the flow resistance in the reducing agent line as a result of the larger cross section is less than in the air line 6. The reducing agent line 8 as far as the nozzle 11 is blown free and cleaned by means of compressed air.

In the connection and line diagram of the exemplary embodiment as shown in FIG. 3, which diagram is shown in FIG. 5, the turbocharger air is routed into the system, not via a bypass, but directly via the air compressor 2. Here the air compressor 2 is connected to the charging air of the internal combustion engine via the line 5. If the air pressure in the supercharger of the internal combustion engine is sufficient, the pump 2 is turned off and is overflowed. Depending on the air pressure measured by means of the sensor 9 within the pressure line 6, the air compressor 2 is turned on or off. From the air compressor 2 the pressure line 6 is connected via a nonreturn valve 12. The air is supplied via the intake line 5 by way of the nonreturn valve 15 which discharges into the intake mouth.

In normal operation, the reducing agent is delivered via the line 7 from a tank by means of the metering pump 1. Charging air overflows the compressor unit 2 and travels via the pressure line 6 to the nozzle 11. In normal operation the valve 17 is closed in the connecting line 16 between the air pressure line 6 and the reducing agent line 8; for venting this reducing agent line 8, this valve 17 is opened.

The invention claimed is:

1. A reducing agent metering system for injecting a reducing agent into the exhaust gas flow of an internal combustion engine for selective catalytic reduction, the metering system being connected/connectable to a reducing agent tank from which reducing agent is taken and conveyed by means of a metering pump (1), and a compressed air supply which has an electrical air compressor (2), the metering system having at least one nozzle (11) which is in a flow connection to a pressure line (6) of the compressed air supply and a pressure line (8) of the metering pump (1) and by which the reducing agent can be injected into the exhaust gas flow by means of compressed air, characterized in that the air compressor (2) is located on a mounting plate (3) and is flanged to the latter, the mounting plate (3) integrating channels which form an intake line (4) and the pressure line (6) of the air compressor (2) and which have connection regions at outlets from the mounting plate (3), and that one or more pockets which are in a flow connection to the channels and which form an intake connection or a pressure connection of the air compressor (2) are made in the mounting plate (3).

2. The metering system as claimed in claim 1, wherein the intake line (4) or the pressure line (6) of the air compressor (2) has at least one nonreturn valve (12).

3. The metering system as claimed in claim 1, wherein at least one other channel (5) is made in the mounting plate (3) into which the pressure line of the air compressor (2) discharges via at least one nonreturn valve (12, 13) and which is supplied with compressed air from the supercharger of the internal combustion engine.

4. The metering system as claimed in claim 1, wherein the metering pump (1) is located on the same (3) or a second mounting plate (3') and flanged on one of said plates, channels which form an intake line (7) and the pressure line (8) of the metering pump (1) being integrated into the mounting plate (3, 3') of the metering pump.

5. The metering system as claimed in claim 1, wherein there is a connecting line (16) between the reducing agent line (8) and a line of the compressed air supply (6), the connection line (16) having a switching valve (17).

6. The metering system as claimed in claim 1, wherein the pressure line (8) of the metering pump (1) includes a pressure sensor (10) or a temperature sensor (10) between the metering pump (1) and the nozzle (11).

7. The metering system as claimed in claim 1, wherein the metering system has a sensor for measuring the exhaust gas temperature.

8. The metering system as claimed in claim 1, wherein the mounting plate (3, 3') is composed of two plates lying on top of one another, channels being made into one or both plates and being closed by the other plate.

9. The metering system as claimed in claim 1, wherein the intake line (4) and the pressure line (6) of the air compressor (2) have at least one nonreturn valve (12).

10. The metering system as claimed in claim 1, wherein the pressure line (8) of the metering pump (1) includes a pressure sensor (10) and a temperature sensor (10) between the metering pump (1) and the nozzle (11).

11. The metering system as claimed in claim 1, wherein there is a pressure sensor (9) in the pressure line (6) of the air compressor (2).

12. The metering system as claimed in claim 11, wherein the intake line (4) or the pressure line (6) of the air compressor (2) has at least one nonreturn valve (12).

13. The metering system as claimed in claim 11, wherein at least one other channel (5) is made in the mounting plate (3) into which the pressure line of the air compressor (2) discharges via at least one nonreturn valve (12, 13) and which is supplied with compressed air from the supercharger of the internal combustion engine.

14. The metering system as claimed in claim 11, wherein the metering pump (1) is located on the same (3) or a second mounting plate (3') and flanged on said mounting plate, channels which form an intake line (7) and the pressure line (8) of the metering pump (1) being integrated into the mounting plate (3, 3') of the metering pump (1).

15. The metering system as claimed in claim 11, wherein there is a connecting line (16) between the reducing agent line (8) and a line of the compressed air supply (6), the connection line (16) having a switching valve (17).

16. The metering system as claimed in claim 11, wherein the pressure line (8) of the metering pump (1) includes a pressure sensor (10) or a temperature sensor (10) between the metering pump (1) and the nozzle (11).

17. The metering system as claimed in claim 11, wherein the metering system has a sensor for measuring the exhaust gas temperature.

18. The metering system as claimed in claim 11, wherein the mounting plate (3, 3') is composed of two plates lying on top of one another, channels being made into one or both plates and being closed by the other plate.

19. The metering system as claimed in claim 11, wherein the intake line (4) and the pressure line (6) of the air compressor (2) have at least one nonreturn valve (12).

20. The metering system as claimed in claim 11, wherein the pressure line (8) of the metering pump (1) includes a pressure sensor (10) and a temperature sensor (10) between the metering pump (1) and the nozzle (11).

* * * * *